US008215025B2

(12) United States Patent
Clarke (10) Patent No.: US 8,215,025 B2
(45) Date of Patent: Jul. 10, 2012

(54) PRISM TRIPOD (76) Inventor: Gerry Clarke, Stoney Creek (CA)

( * ) Notice: Subject to any disclaimer, the term of this patent is extended or adjusted under 35 U.S.C. 154(b) by 0 days.

(21) Appl. No.: 13/089,465

(22) Filed: Apr. 19, 2011

(65) Prior Publication Data

US 2011/0258865 A1 Oct. 27, 2011

Related U.S. Application Data (60) Provisional application No. 61/328,377, filed on Apr. 27, 2010.

(51) Int. Cl.
G01C 5/00 (2006.01)
(52) U.S. Cl. ......................................................... 33/290
(58) Field of Classification Search .................. 33/290, 33/291, 292, 293, DIG. 21
See application file for complete search history.

(56) References Cited

U.S. PATENT DOCUMENTS

| 3,667,849 | A | * | 6/1972 | Appler et al. | 33/DIG. 21 |
| 4,852,265 | A | * | 8/1989 | Rando et al. | 33/227 |
| 4,949,467 | A | * | 8/1990 | Oman et al. | 33/291 |
| 5,012,585 | A | * | 5/1991 | DiMaggio | 33/286 |
| 5,690,418 | A | * | 11/1997 | Hsiung | 33/286 |
| 5,838,431 | A | * | 11/1998 | Hara et al. | 33/290 |
| 6,009,630 | A | * | 1/2000 | Rando | 33/365 |
| 7,296,360 | B2 | * | 11/2007 | El-Katcha et al. | 33/286 |
| 7,509,747 | B2 | * | 3/2009 | Sudou et al. | 33/290 |
| 7,520,064 | B2 | * | 4/2009 | Hayase et al. | 33/290 |
| 2005/0166409 | A1 | * | 8/2005 | Chou et al. | 33/290 |
| 2009/0101772 | A1 | * | 4/2009 | Bevirt | 33/290 |
| 2010/0212169 | A1 | * | 8/2010 | Fleenor et al. | 33/293 |
| 2012/0090184 | A1 | * | 4/2012 | Zimmermann | 33/291 |

* cited by examiner

Primary Examiner — G. Bradley Bennett (57) ABSTRACT

A Prism Tripod includes a planar base including a supported portion and a cantilever portion. Preferably the base includes a cantilever axis, and a point axis, wherein the cantilever axis within the cantilever portion and the point axis within the supported portion. The prism tripod including at least three legs supporting the base and a laser holder for supporting a locating device and a laser. The base is adapted to demountably receive the laser holder along the cantilever axis, wherein the laser and locating device mounted along the cantilever axis.

10 Claims, 10 Drawing Sheets

PRISM TRIPOD

This application claims priority from previously filed U.S. provisional application 61/328,377 filed on Apr. 27, 2010 by Gerry Clarke under the title Prism Tripod.

FIELD OF THE INVENTION

The present device relates to surveying equipment in particular relates to a device and method for finding points and also for marking points namely a prism tripod and method of use therefore.

SUMMARY OF THE INVENTION

Modern day surveying methods use a robotic total station system in order to determine the location of existing points and also to demark the location of new points to be laid out and marked in the field.

Presently a prism is generally attached to a handheld post and/or pole, which generally has a pointed end for placement onto the desired location. A robotic total station surveying equipment will generally communicate via the prism to indicate to the user the location of the prism attached to a handheld post or a pole.

To a certain extent the steadiness of the hand in holding the post or pole on which the prism is mounted can determine the accuracy to which one is able to locate a given point. The users hand will never be totally steady and there will always be some motion and/or swaying of the post or pole on which the prism is located thereby creating a certain margin of error in the location of a specific point which the post or pole is touching.

In some instances the accuracy required by the engineering and/or architectural specifications is such that the surveyors find it difficult to obtain a quick and accurate location of particular points, which they need to lay out and determine the location of in the field.

In addition once that point or position is found using the handheld post or pole the surveyor then must in some manner mark or demark the location for future reference by construction personnel.

In practice often the surveyor will simply scribe or scratch the location of the point by forcibly scratching or scribing the end of the point of the post or pole into the ground, concrete, steel, or other material on which the post or pole is placed.

The combination of these factors creates a certain amount of uncertainty and error in locating and demarking points to be laid out by the surveyor and at times the accuracy that one is able to obtain using a handheld post or pole onto which a prism is mounted is insufficient in providing the accuracy required by the architectural or engineering specifications.

Therefore there is a need for a device and method for quickly and accurately locating points, which are already in existence or must be determined. There is a need for a device, which eliminates the variations introduced by the handheld post or pole which is currently used and also provides for a quick and accurate method of locating or demarking a point in the field.

BRIEF DESCRIPTION OF THE DRAWINGS

With the intention of providing demonstration of the characteristics of the device or method, an example is given below, without any restrictive character whatsoever, with reference to the corresponding figures, of a preferred embodiment of the device and method as follows.

DESCRIPTION OF THE PREFERRED EMBODIMENTS

Figure 3:
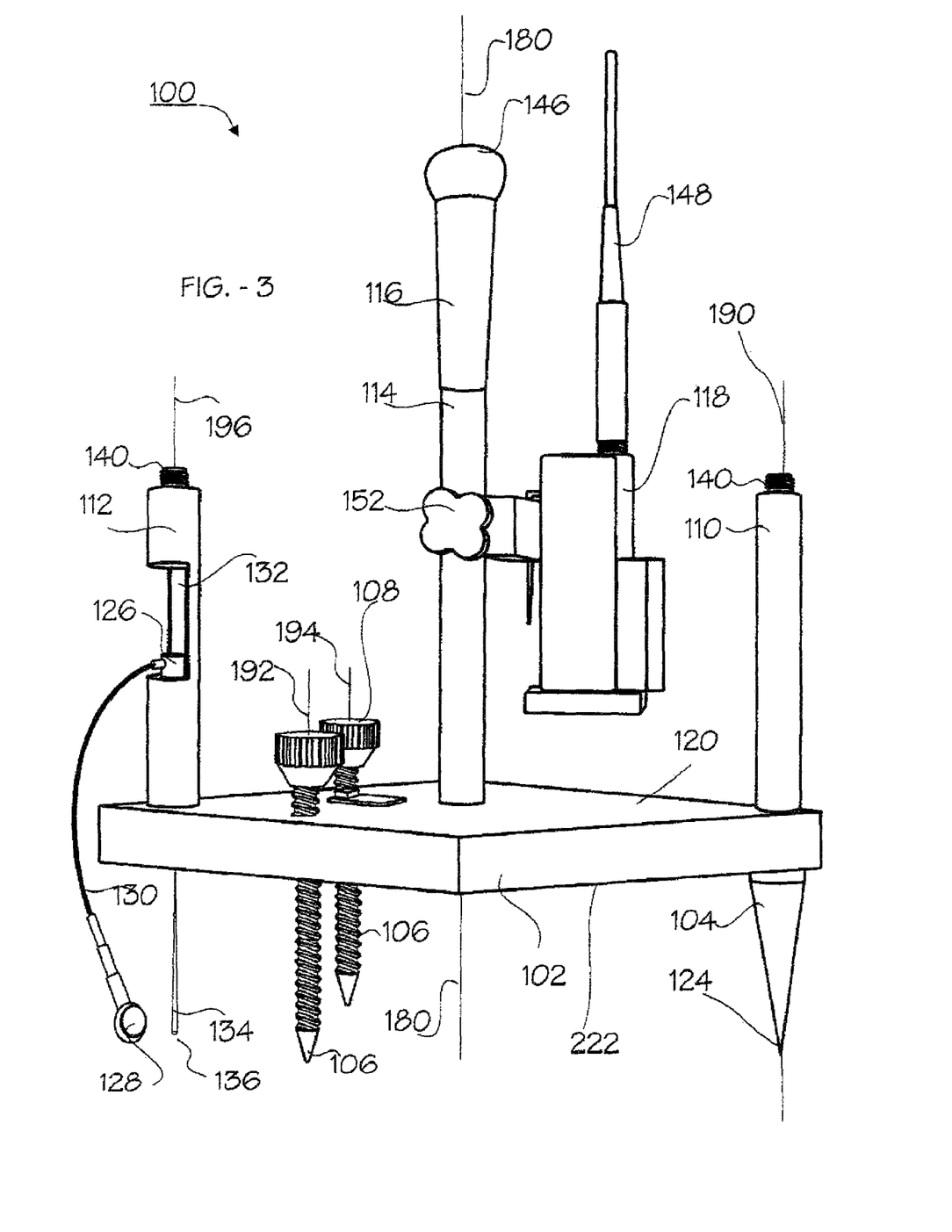
FIG. 3 is a side perspective schematic elevational view of the prism tripod shown together with a transponder mounted thereon.

Referring first of all to FIG. 3, which shows the prism tripod generally as 100 together with a transponder 118 mounted thereon. Prism tripod 100 includes the following major components namely base 102 having a stationary leg 104, two adjustable legs 106 each having a thumb screw head 108 for the purpose of manually turning adjustable legs 106. Stationary leg 104 preferable terminates in a point 124 and also includes a prism extension 110 having a threaded end 140 all extending along point axis 190.

Extending along cantilever axis 196 is a laser holder 112 having a threaded end 140 and an opening 132 for receiving a laser 126 therein. Laser 126 also includes a switch 128 in electrical communication with laser 126 with a wire 130. A laser 126 projects a laser beam 134 terminating at laser point 136 when it impinges upon the desired surface.

Figure 2:
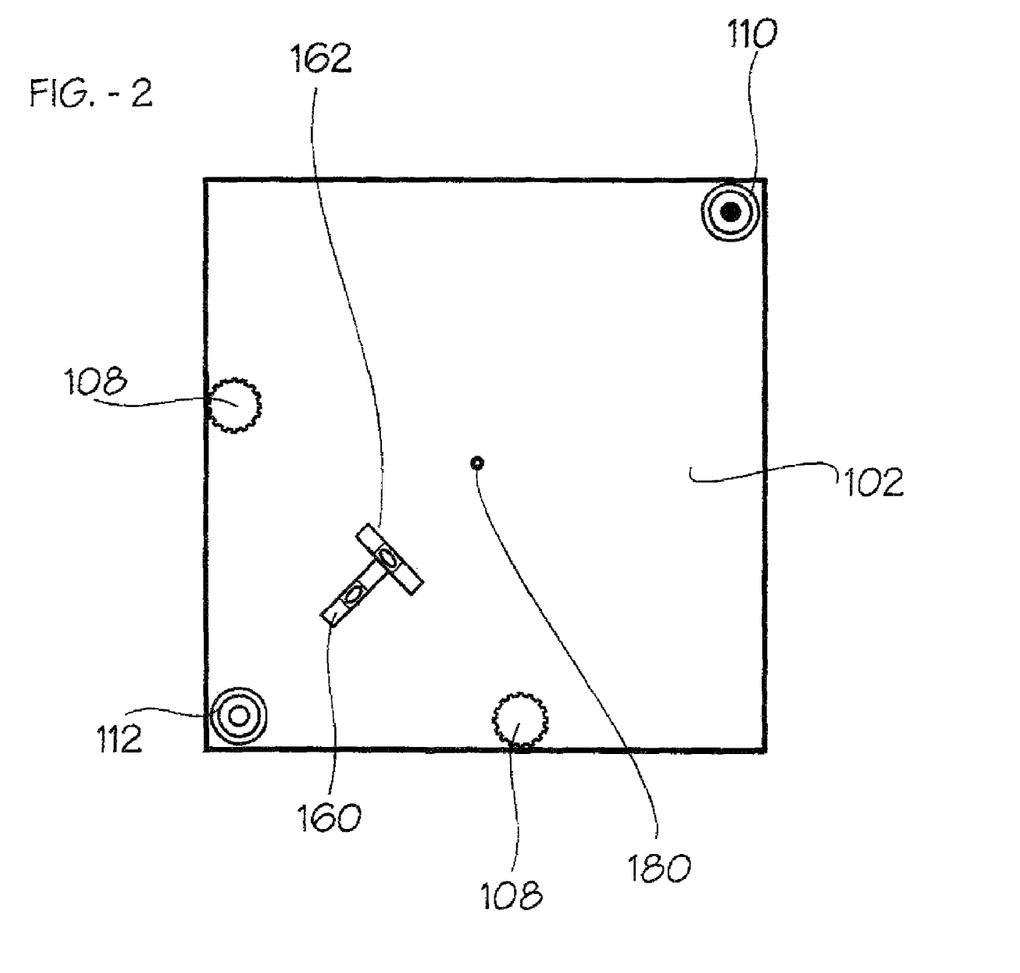
FIG. 2 is a top schematic plan view of the top surface of the base.

Base 102 further includes a top surface 120, a bottom surface 122. Mounted on top surface 120 of base 102 is a set of bubble levels shown as 160 and 162 in FIG. 2.

Base 102 has attached thereto a central post 114 extending along central axis 180 which has a handle 116 and a knob 146 at it's distal end.

Shown in FIG. 3 is a transponder 118 attached to central post 114 with a bracket 150, which includes a thumbscrew 152.

Laser 126 is shown in the installed position 210 housed within an opening 132 of laser holder 112.

Figure 1:
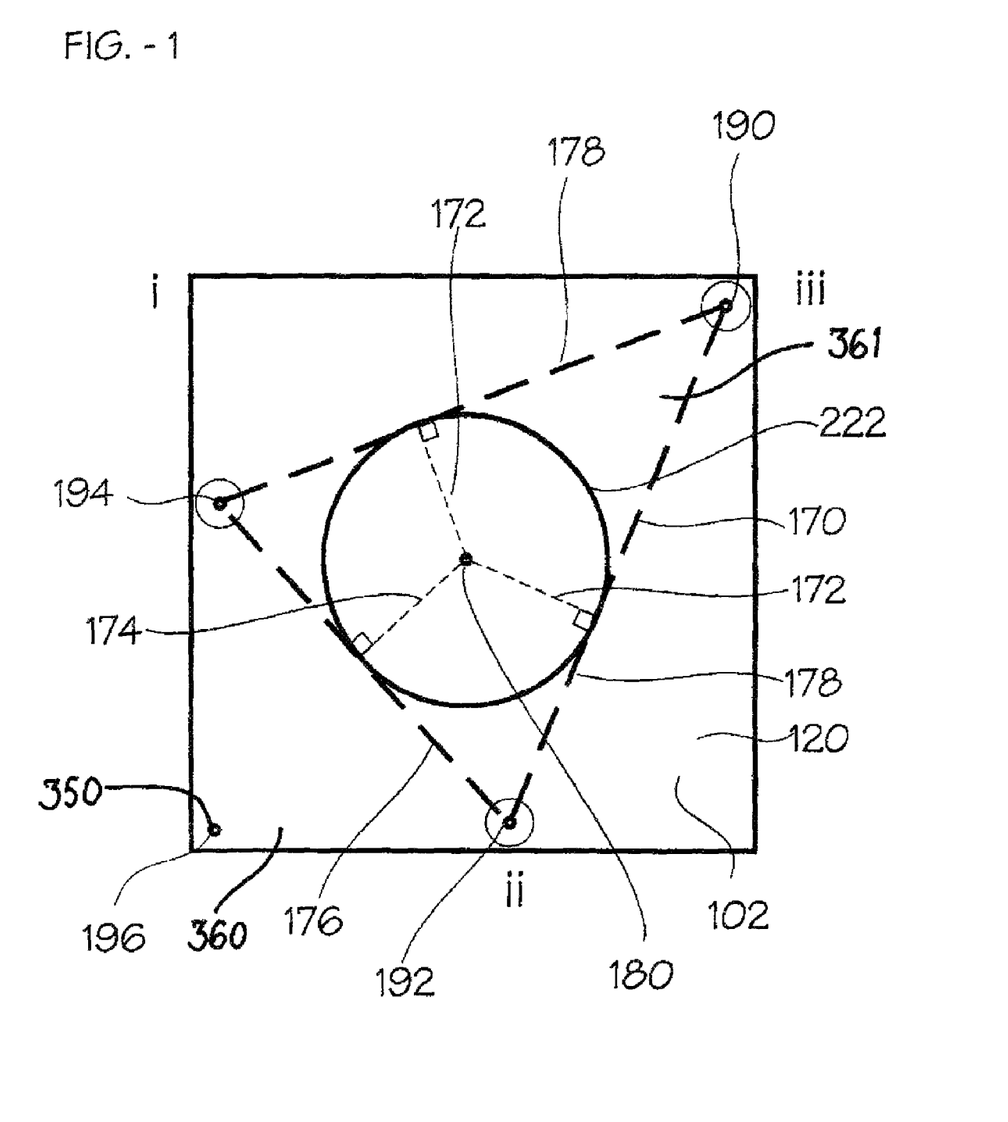
FIG. 1 is a top schematic plan view of a geometrical layout of the elements of the base.

Additionally adjustable legs 106 are mounted and extend along adjustable leg axis 192 and 194 as shown in FIG. 1.

Figure 4:
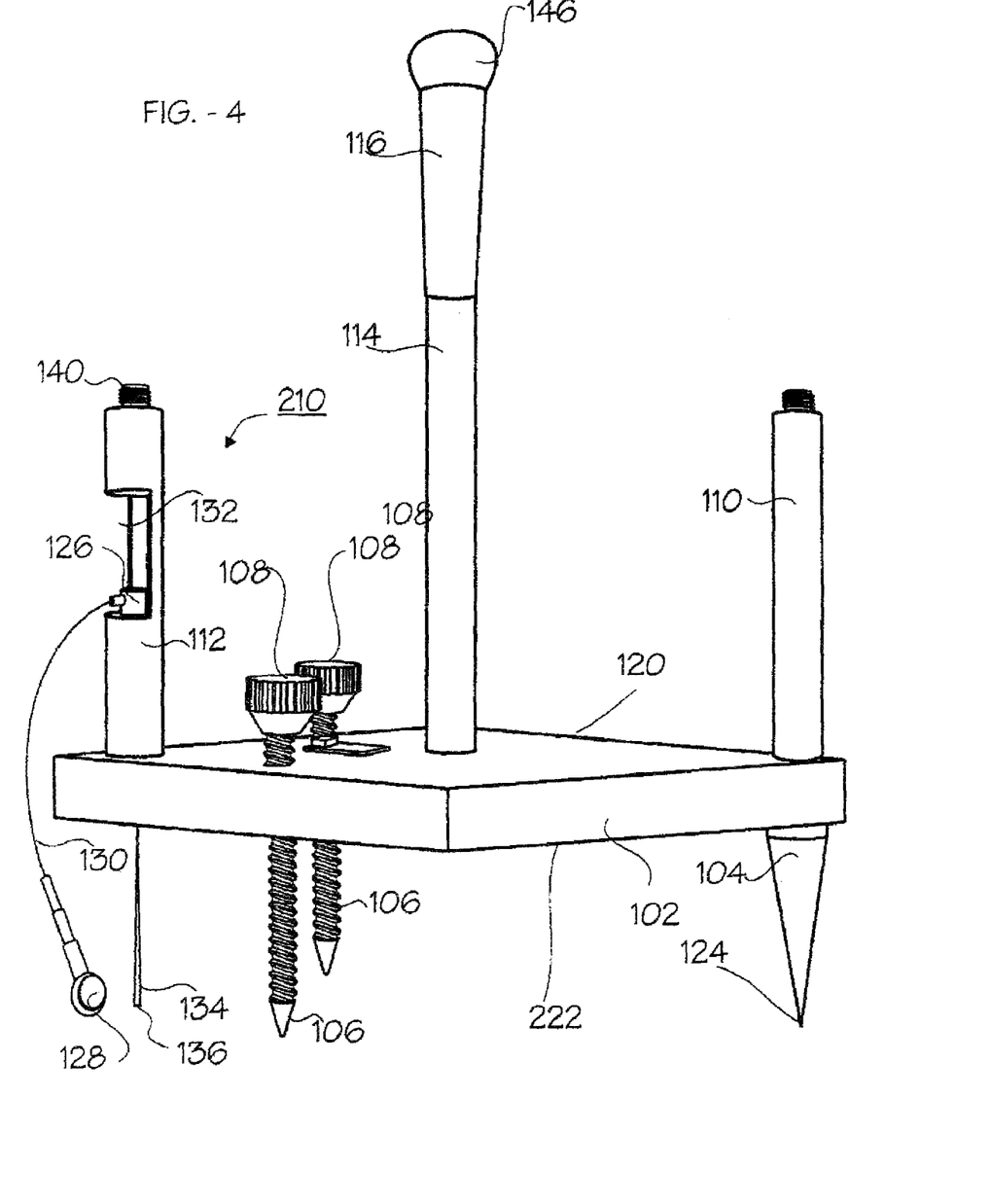
FIG. 4 is a side perspective schematic view of the prism tripod without the transponder mounted thereon.

FIG. 4 shows prism tripod 100 without transponder 118 mounted thereon and without bracket 150 mounted onto central post 114.

Figure 5:
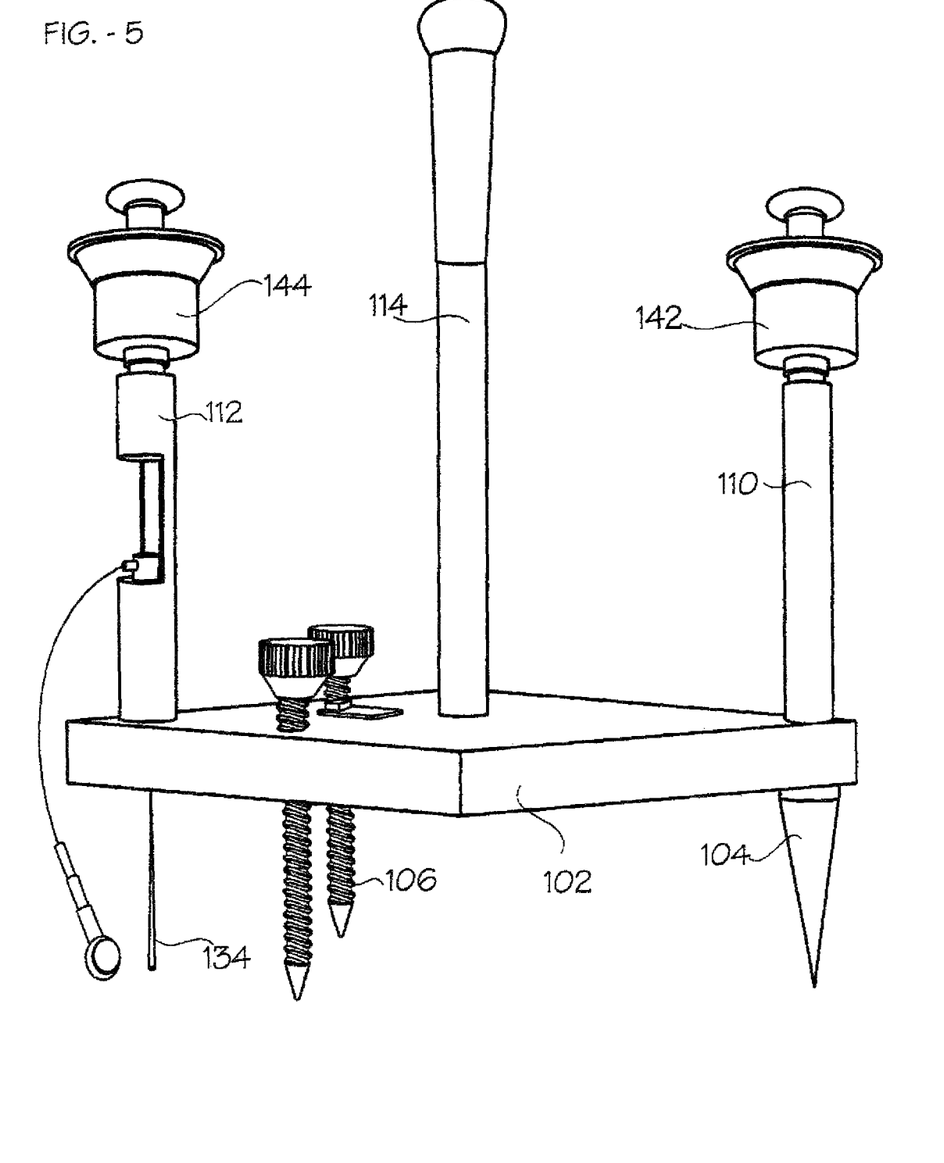
FIG. 5 is a side perspective schematic view of the prism tripod together with two prisms mounted on both the prism extension as well as the laser holder.

FIG. 5 shows prisms 142 mounted onto threaded end of prism extension 110 and prism 144 mounted onto threaded end 140 of laser holder 112.

Figure 6:
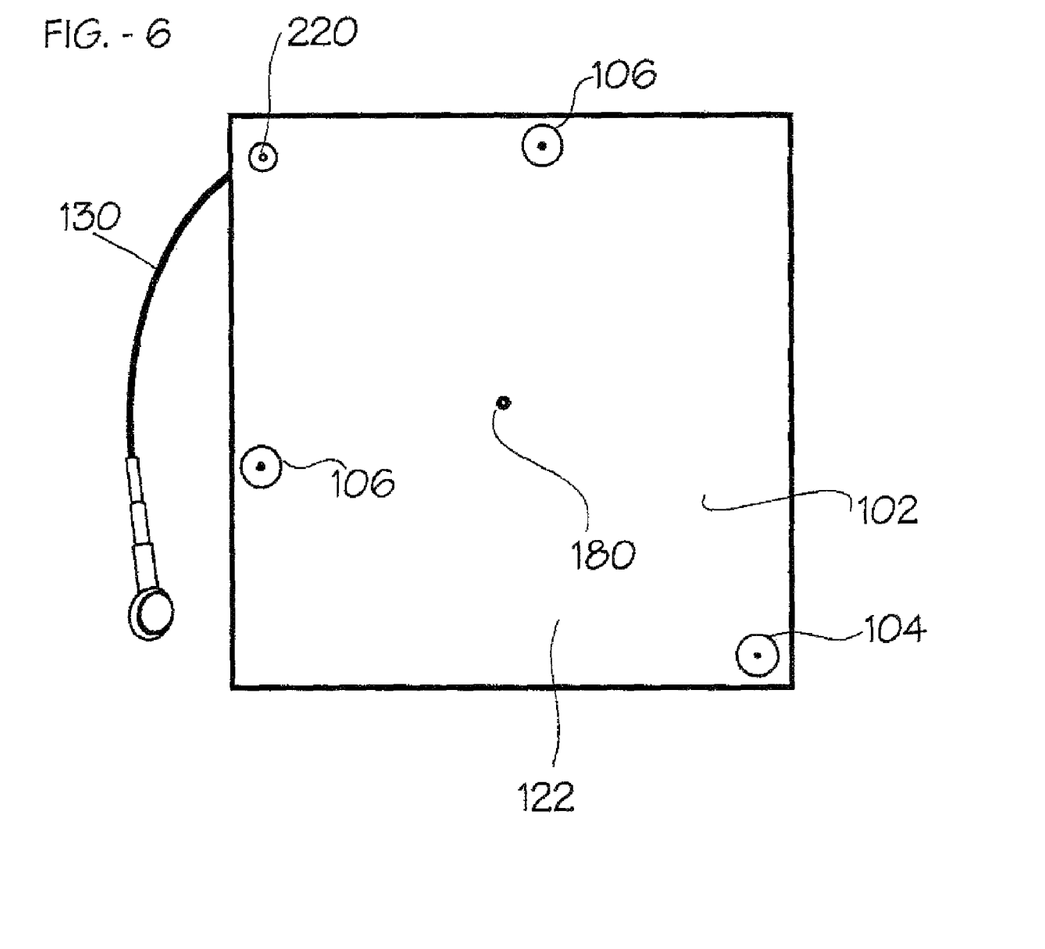
FIG. 6 is a schematic bottom plan view of the bottom surface of the base.
Figure 7:
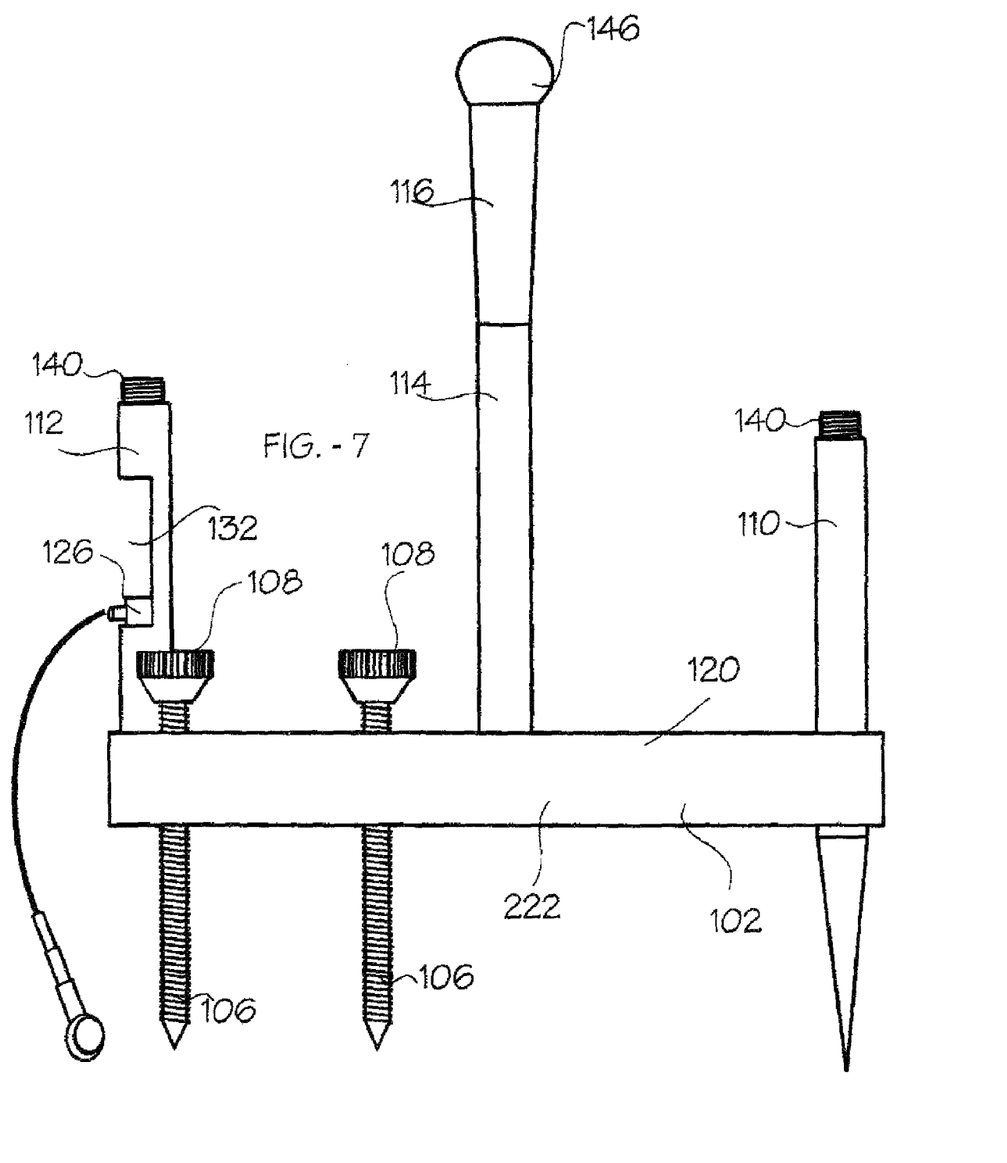
FIG. 7 is a side elevational schematic view of the prism tripod without the transponder attached.

In practice a prism would be mounted onto one or the other of threaded ends 140 but usually not two prisms on each end simultaneously. FIG. 6 is a bottom plan view of the bottom surface 122 of base 102 in particular FIG. 6 shows laser aperture 220 which is a fine hole through which laser beam 134 is projected in order to display a laser point 136 onto the surface on which it is pointed.

Figures 8, 9:
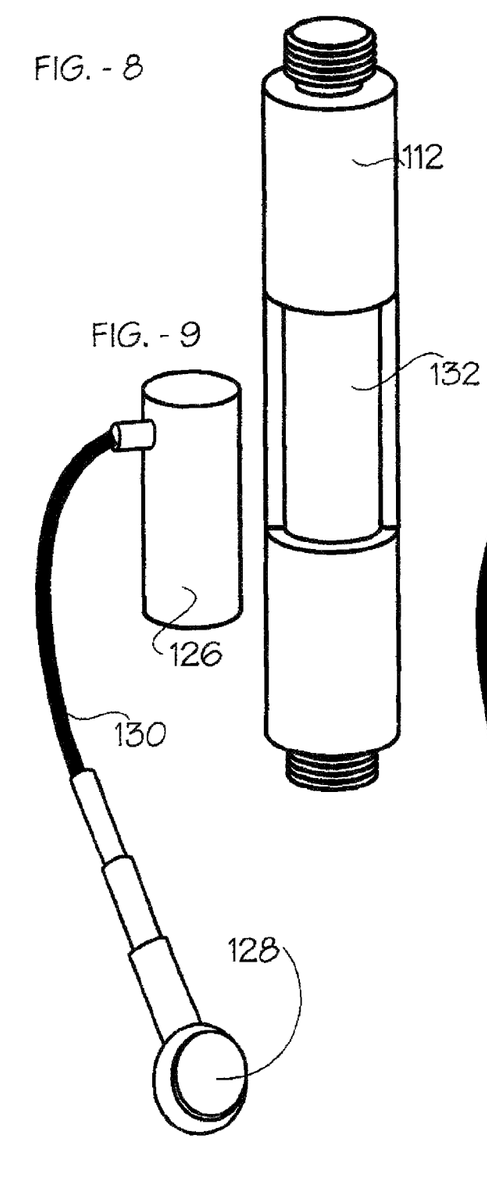
FIG. 8 is a side perspective view of the laser holder showing the opening 132.
FIG. 9 is a side perspective view of the laser together with the wire and switch
Figure 10:
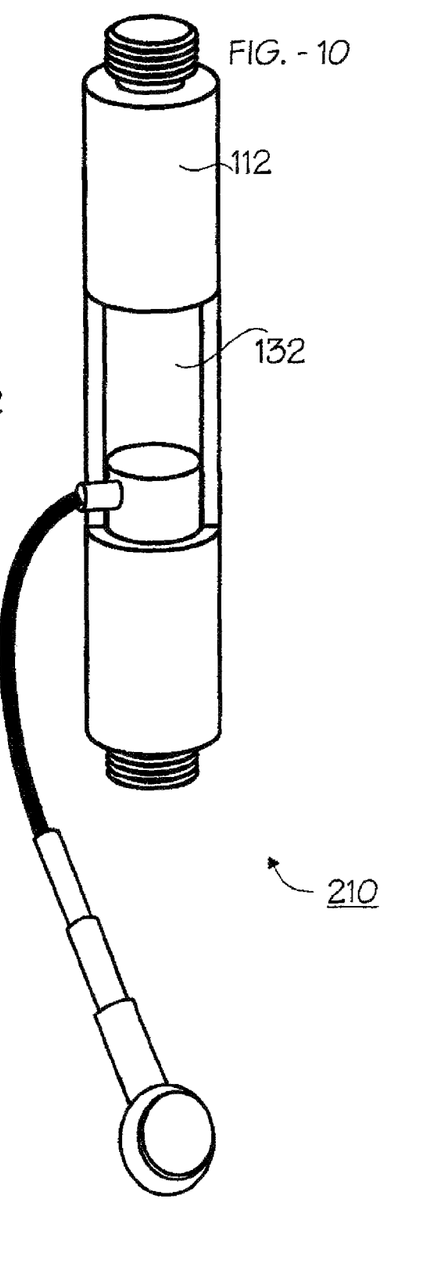
FIG. 10 is a side perspective view of the laser holder together with the laser installed in the opening defined within the laser holder showing the laser in the installed position.

Referring now to FIGS. 8, 9 and 10, which show some of the details of laser holder 112 and laser 126. FIG. 8 for example shows the laser holder 112 having a housing, which includes an opening 132.

Opening 132 is sized to permit placement of laser 126 therein and into the installed position 210 shown in FIG. 10.

Laser 126 includes a wire 130 and a switch 128 for manually turning laser 126 on and off.

FIG. 1 shows the geometrical relationships between a central axis 180 and point axis 190 adjustable leg axis 192 and adjustable leg axis 194.

The circle 122 drawn about central axis 180 will meet tangentially at each of the triangle sides 178 triangle base 176. Triangle 170 is an isosceles triangle having equi-length triangle sides 178 and triangle base 176.

Perpendiculars 174 shown schematically in dashed lines which pass through central access 180 and meet the outer diameter circle 222 at the tangential intersection between circle 222 and the sides of triangle 170 as depicted in FIG. 1.

The reader will note that perpendiculars 174 are in fact normal to each of the triangle sides 178 and triangle base 176 as depicted.

Figure 11:
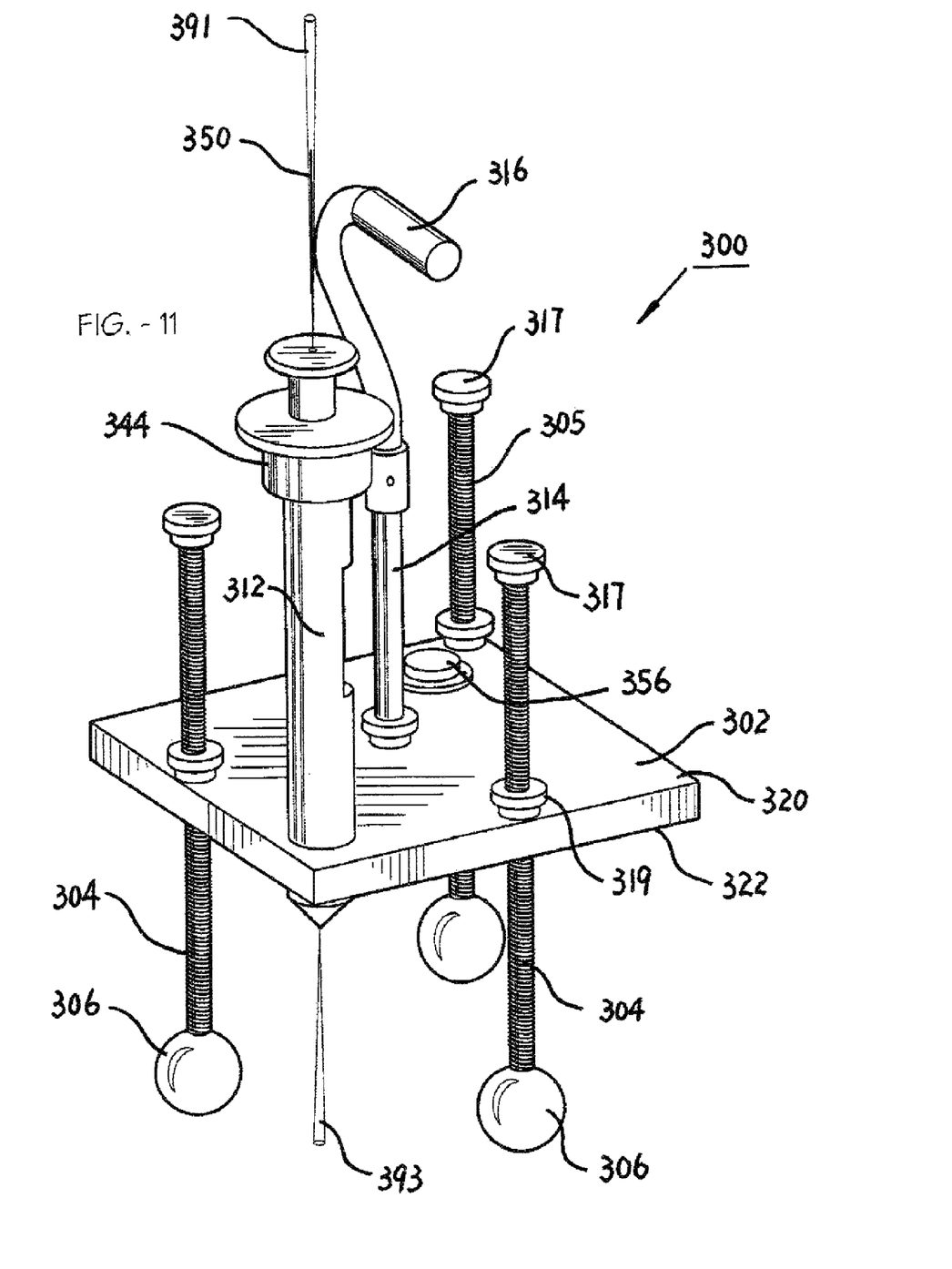
FIG. 11 is a side perspective schematic elevational view of the prism tripod shown together with a laser holder and a prism mounted thereon along the cantilever axis and adjustable legs with ball ends.
Figure 12:
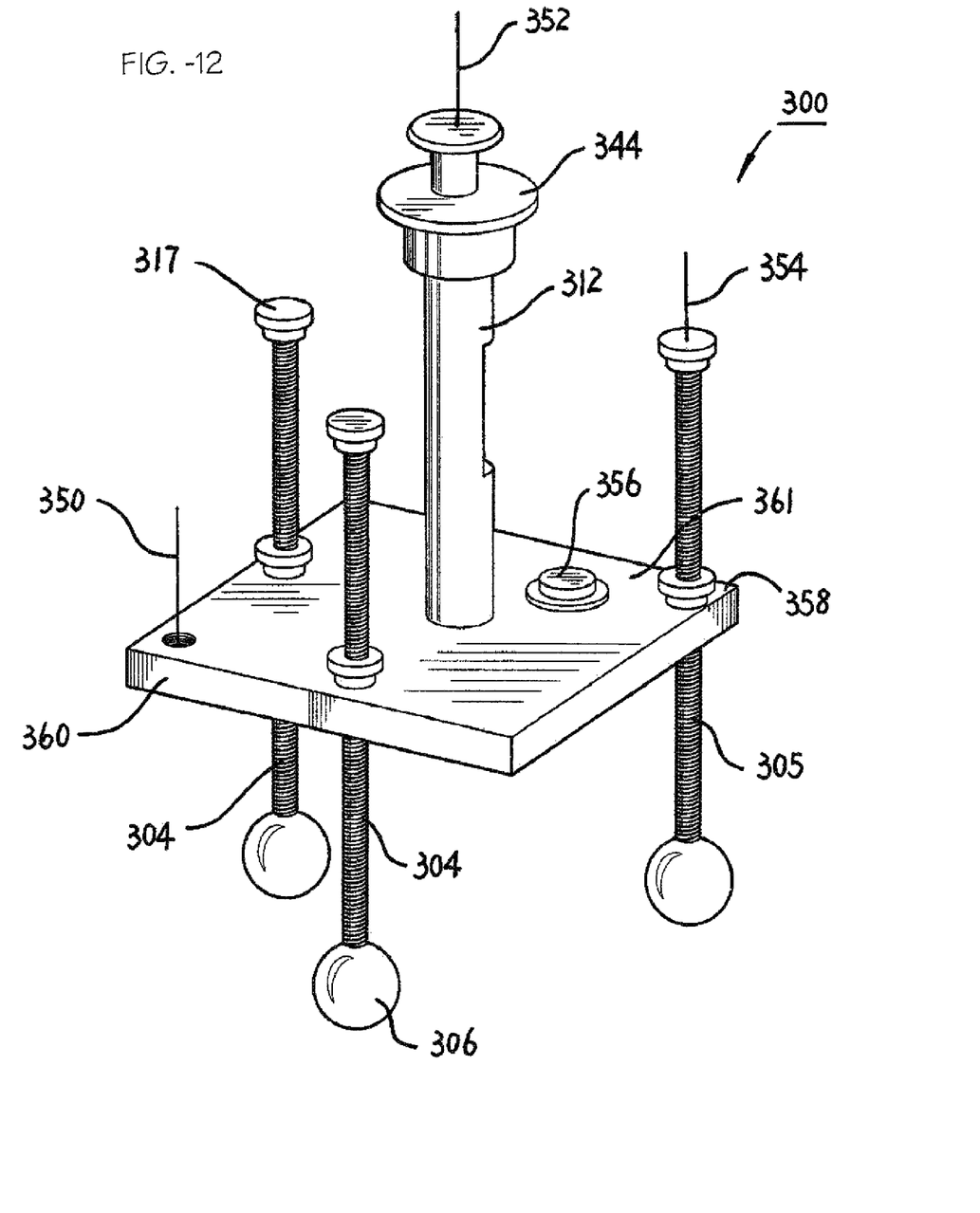
FIG. 12 is a side perspective schematic elevational view of the prism tripod shown together with a laser holder and a prism mounted thereon along a central axis and adjustable legs with ball ends.

Referring now to FIGS. 11 and 12 an alternate embodiment showing prism tripod 300 which includes the following major components namely: base 302 having a top surface 320 and a bottom surface 322. Base 302 being supported by edge adjustable legs 304 and a corner adjustable leg 305. Each adjustable leg including thumb screws 317 and lock collars 319 for locking the adjustable legs into position.

Prism tripod 300 further including the bubble level 356 attached to the top surface 320 for levelling base 302. Prism tripod 300 also including a central post 314 oriented along central axis 352 and a handle 316 attached to the central post for carrying prism tripod 300.

Shown in FIG. 11 laser holder 312 having mounted thereon prism 344 is shown oriented along cantilever access 350. Laser holder 312 is almost identical to laser holder 112 as described previously and houses laser 126 therein for creating a laser beam 134 and projecting a laser point 136 along cantilever access 350.

As shown in FIG. 12 laser holder 312 can be positioned in three discreet positions namely along cantilever access 350 as shown in FIG. 11 along central access 352 as shown in FIG. 12 and along point access 354 not shown in FIG. 11 or 12 however shown in FIG. 5.

Normally when laser holder 312 together with prism 344 is mounted along point access 354 corner adjustable leg 305 is replaced with a stationery leg 104 having a point 124 as shown in FIG. 3.

In FIGS. 11 and 12 the adjustable legs 304 and corner adjustable legs 305 are shown with ball ends 306. It is possible to use any combination of leg end including pointed ends as shown in FIG. 3 for example and/or a combination of ball ends 306 together with a pointed end 124.

For example edge adjustable legs 304 could be fitted with ball ends 306 and corner adjustable leg 305 could be fitted with point 124 or corner adjustable leg 305 could be completely replaced with a stationary leg 104 having a point 124 as shown in FIG. 3.

In Use

Referring to the prism tripod 300 shown in FIGS. 11 and 12 it is apparent to a person skilled in the art that laser holder 312 together with prism 344 can be placed in three discreet positions including along cantilever access 350 along central access 352 and also along point access 354.

Base 302 includes a cantilever corner 360 which allows one to position base 302 over a point which one is wanting to lay out.

In other words should a surveyor wish to lay out a new point one would normally place laser holder 312 together with a prism 344 along cantilever access 350 such that the laser 126 can project a laser beam 134 and mark a laser point 136 in the desired location.

On the other hand if one is looking to determine the location of a pre-existing point one would rather place laser holder 312 along point access 354 and one would likely replace corner adjustable leg 305 with a stationary leg 104 having a point 124. In this manner one could place point 124 onto the pre-existing point and determine it's location.

There is the other third configuration for prism tripod 300 namely laser holder 312 together with prism 344 could be installed along central access 352. In this configuration one could lay out a point which falls in between the adjustable legs such as laying out points within circular tubes and other geometrical configurations which are much easier completed by placing laser holder 312 and prism 344 along central access 352.

The reader will note that base 302 includes an unsupported cantilever portion 360 and a supported portion 361. Supported portion 361 is defined by the area within triangle 170. The unsupported portion is defined by the area outside triangle 170 and includes the cantilever portion 360 shown in FIG. 12 and also in FIG. 1. Base 302 also includes other cantilever portions which are the portions outside of triangle 170 as shown in FIG. 1. These other cantilever portions are not used in the presently preferred embodiment however could be used for other locations of laser holder 312 and prism 344.

The reader will note that prism 344 which is allocating device could also include a GPS unit and/or a back sight or any other surveying type of locating device for demarcation layout and/or location of points. In this specification locating device refers to surveying instruments such as prisms, GPS's, back sights and the like.

Laser 126 is adapted to project a laser beam 134 downwardly shown as lower beam 393 and also upwardly shown as upper beam 391. This beam can be projected upwardly and downwardly simultaneously or independently.

A surveyor using the prism tripod 100 or 300 as described above and depicted above will note immediately that it eliminates the need for hand holding of a prism pole and/or post. Tripod 100 and 300 operate in analogous fashion with some small differences which are discussed.

The prior art device is very similar to the stationery leg 104 together with the prism extension 110 and a prism 142 mounted thereon. The present device the prism tripod 100 rigidly attaches the components of a typical prism holding rod and/or post onto base 102 as shown in the figures in particular FIGS. 3 and 5. By ensuring that prism extension 110, stationery leg 104 having point 124 and prism 142 are carefully aligned along point axis 180 always ensures that prism 142 is aligned above point 124. For example should the surveyor wish to determine the location of a particular point which has already been demarked in the field the surveyor could simply place point 124 of prism tripod 100 onto the demarked point and level base 102 using thumbscrew heads 108 which screwably right raise and lower adjustable legs 106 until such time as the user can visually see that base 102 is level according to bubble level 162 and bubble level 160. Once point 124 is placed onto the demarked point and adjustable legs 106 are adjusted such that base 102 is level the user can then use the robotic total station to determine the location of prism 142 which in turn will tell the surveyor the exact location upon which point 124 is resting. Movement due to hand holding of a prism post and/or pole has been totally eliminated and errors in the location of a demarked point has been minimized.

On the other hand if a surveyor is seeking to lay out a particular point and mark the position of the point, the surveyor will place prism 144 on to the top of laser holder 112 namely onto threaded end 140. Laser holder 112 and prism 144 will be aligned along cantilever axis 196 therefore ensuring that wherever the laser beam 134 projects a laser point 136 it is in alignment with the prism 144.

In this manner the surveyor can manipulate prism tripod 100 until such time as a robotic total station will tell the user that prism 144 is directly above the desired location. The surveyor can then turn on laser point 136 by depressing switch 128 and thereby laser beam 134 will exactly impinge upon and mark with a laser point 136 the location of the point, which the surveyor wishes to demark.

The surveyor can then either use a stamp, ink, line, and/or any other marking tool to very accurately mark the location of laser point 136 which is the point that has been laid out by the surveyor.

In this process of course the user of prism tripod 100 will have leveled base 102 using thumbscrew heads 108 thereby screwably raising and lowering adjustable legs 106 until such time as base 102 is level as indicated by bubble levels 160 and 162.

It will be apparent to the reader that it is very simple and easy to demark a point in that even when a demarking tool such as a stamp or a pen or an ink line or a scribe is placed on the point one can visually determine very accurately that the mark being made is exactly at the point that has been surveyed. Additionally one is able to visually detect the location of the demarcation that has been made as either a scratch or an ink mark, after the mark has been made by ensuring that the laser point is directly on top and shines onto the mark that has been placed by the surveyor.

It should be apparent to persons skilled in the art of various modification and adaptations of the structure described above are possible without departure from the spirit of the invention the scope of which is defined in the appended claims.

I claim:

1. A Prism Tripod comprising:
    a) a planar base including a supported portion and a cantilever portion,
    b) the base including a cantilever axis, and a point axis, wherein the cantilever axis within the cantilever portion and the point axis within the supported portion,
    c) at least three legs supporting the base the legs,
    d) a laser holder for supporting a locating device and a laser,
    e) wherein the base is adapted to demountably receive the laser holder along the cantilever axis, and wherein the laser and locating device mounted along the cantilever axis.

2. The Prism Tripod claimed in claim 1 wherein the base adapted to selectively receive the laser holder mounted along the cantilever axis, and a stationary leg having a point along the point axis.

3. The Prism Tripod claimed in claim 1 wherein the base adapted to selectively receive the laser holder mounted to the base along the cantilever axis, and along the point axis.

4. The Prism Tripod claimed in claim 1 wherein the base adapted to selectively receive the laser holder mounted to the base along the cantilever axis, and along the point axis and along the central axis.

5. The prism tripod claimed in claim 1 wherein the locating device includes a prism.

6. The prism tripod claimed in claim 1 wherein the legs including a ball end.

7. The prism tripod claimed in claim 1 wherein the prism tripod including a demountable central post attached at one end to the base and having attached a handle at the other end and extending along a central axis.

8. The prism tripod claimed in claim 1 wherein the laser adapted to selectively project an upper laser beam upwardly and a lower laser beam downwardly.

9. The prism tripod claimed in claim 1 wherein the legs including a ball end.

10. The prism tripod claimed in claim 1 wherein the legs being height adjustable.

* * * * *